United States Patent Office 2,878,111
Patented Mar. 17, 1959

2,878,111

WATER-RESISTANT ABRASIVE STRUCTURES

Rupert S. Daniels, Union Township, Union County, and Anthony J. Mostello, Newark, N. J., assignors to Union Carbide Corporation, a corporation of New York No Drawing. Application September 21, 1954
Serial No. 457,571

4 Claims. (Cl. 51—298)

This invention relates to improvements in rigid abrasive structures such as grinding wheels, whetstones, hones and in flexible abrasive structures such as abrasive coated paper or cloth in which structures the abrasive particles are bonded by a thermoset phenol-aldehyde resin.

The employment of thermosetting phenol-aldehyde resins as binders for abrasive structures has been practiced for more than twenty-five years. The general technic for applying phenolic resins to abrasive matter and which are still generally employed by the industry particularly in the manufacture of rigid abrasive structures are described in U. S. Patents 1,537,454 to Brock; 1,626,246 and its Reissue 19,318 to Martin; 1,989,243 to Nash et al. and 2,076,517 to Robie.

In essence the basic system described in all the aforementioned patents for the manufacture of phenolic resin bonded rigid abrasive structures is dependent upon wetting the abrasive grains with a wetting agent which may be either a liquid thermosetting phenol-aldehyde resin or a solvent for phenolic resins such as furfural or a combination of both. The wetted abrasive grains are then mixed with sufficient powdered thermosetting phenolic resin to form a relatively dry pourable mix in which the powdered resin is adhesively secured to abrasive particle surfaces by the action of the wetting agent. The dry mix may be hot pressed and cured in molds, or it can be cold pressed to desired shapes which are then baked, preferably over an extended period and at gradually increasing temperatures to effect hardening of the resin binder to an infusible condition.

The resultant abrasive structures generally meet the severe requirement encountered in heavy duty grinding operations being resistant to shock and high temperatures, provided, however, that they are operated under dry conditions. They are not completely satisfactory for wet grinding conditions in as much as water in some manner adversely affects the bond strength of the phenolic resin binder to the abrasive particles whereby such wheels and particularly those having an open grain structure are rapidly consumed or worn out in considerably less operational time as compared to the performance obtained under dry grinding conditions. The poorer bond strengths resulting from exposure to water is readily shown by flexural strength measurements.

According to the present invention phenolic resin bonded structures of greatly improved resistance to the usual weakening effects caused by exposure to water are obtained by first forming on the abrasive grain surfaces a thin, adherent, heat-cured coating of vinyl polysiloxane resin, and then bonding the thus treated abrasive grains with a heat-hardenable phenolic resin to form bonded abrasive structures such as grinding wheels, cut-off wheels, snagging wheels, hones, or other abrasive implements such as abrasive coated paper or cloth.

The thickness of the vinyl polysiloxane coating on the abrasive grains should preferably be controlled by suitable adjustment of the weight of applied vinyl polysiloxane coating material to the total surface area of the abrasive such that after application and curing of the vinyl polysiloxane resin, the resultant coating has an average calculated thickness between about one and about 200 molecules, the best results being obtained with the coating thicknesses between about 4 and 100 molecules. Such a coating thickness is insufficient to cause bonding together of individual coated abrasive particles.

The calculated molecular thickness of the vinyl polysiloxane coating is derived from computations based on the weight of vinyl polysiloxane deposited on a given weight of abrasive particles graded within a narrow particles size range in order that the determination of average particle surface area be a reasonably accurate value. For most practical purposes, a vinyl polysiloxane coating thickness of between 1 and 200 molecules exists when the vinyl polysiloxane coating is between 0.0001% and 0.35% by weight of the abrasive grain and the grain has an average particle size between 8 and 100 mesh. Obviously the larger the average abrasive grain particle size is, the smaller is its total surface area for a given weight quantity and hence a given weight of polysiloxane coating thereon will be of greater thickness compared to the thickness obtained when coated on the same weight quantity of smaller average particle size abrasive.

This relationship is more specifically shown in Table I wherein there is tabulated the percent by weight of vinyl polysiloxane required to form a coating thickness of 7 molecules and of 100 molecules thickness on aluminum oxide abrasive grains having different average particle size.

TABLE I

| Aluminum Oxide Abrasive Grit No.[1] | Percent by Weight of Vinyl Polysiloxane on Abrasive Grain to Form Coating 7 Molecules Thick | Percent by Weight of Vinyl Polysiloxane on Abrasive Grain to Form Coating 100 Molecules Thick |
|---|---|---|
| 8 | 0.0012 | 0.017 |
| 10 | 0.0014 | 0.020 |
| 12 | 0.0017 | 0.024 |
| 14 | 0.0020 | 0.029 |
| 16 | 0.0024 | 0.034 |
| 20 | 0.0035 | 0.049 |
| 54 | 0.0095 | 0.135 |
| 60 | 0.018 | 0.168 |
| 70 | 0.0134 | 0.192 |
| 80 | 0.0157 | 0.225 |
| 100 | 0.0245 | 0.350 |

[1] Grit No. refers to the size of sieve opening used to determine the average abrasive grain size in accordance with U.S. Department of Commerce Bulletin 118-50 on Abrasive Grain Sizes.

The values given in Table I are based on aluminum oxide of specific gravity 3.95 and will have to be changed if other types of abrasive grains are used. In this case the values given should be multiplied by the factor 3.95 divided by the specific gravity of the abrasive used.

We have found that the strengths of these abrasive wheels is dependent upon the amount of polysiloxane deposited on the grain. Thus, amounts smaller than .0001% by weight of the grain have proven to be insufficiently effective, while amounts greater than 0.35% have given results no more effective than uncoated grain and if an amount considerably greater than this is used, the strength of the wheel is less than that fabricated from uncoated grain.

The heat-curing of the vinyl polysiloxane resin has been found to be somewhat critical as to time and temperature. Curing temperatures between about 200° C. and 400° C. generally impart optimum results as measured by flexural strength tests determined on phenolic resin bonded abrasive structures made therefrom. In general, higher baking temperatures require shorter curing times. Thus, fifteen minutes baking at 400° C. is usually adequate to properly cure the vinyl polysiloxane resin, whereas at the lower baking temperature of 200° C. about an hour is generally required. Temperatures above 400° C. can be employed providing exposure to such temperatures is limited to prevent decomposition of the siloxane.

A satisfactory coating of vinyl polysiloxane resin can be formed on abrasive grain surfaces by use of known intermediates of vinyl polysiloxane such as the vinyl silanes, or soluble vinyl polysiloxane polymers containing unreacted hydroxyl groups.

The vinyl silanes are the simplest intermediates useful in preparing a vinyl polysiloxane resin. Suitable vinyl silanes are the trifunctional mono-vinyl silanes having the structure:

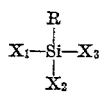

wherein R is the vinyl group (—CH:CH$_2$) and $X_1$, $X_2$ and $X_3$ represent each the same or a different monofunctional group, which is either an alkoxy group as for example methoxy, ethoxy, butoxy and 2-methoxy ethoxy, or a halogen as for example chlorine, fluorine or bromine. Examples of vinylsilanes having the same functional group for $X_1$, $X_2$, and $X_3$ are vinyl tris methoxy silane, vinyl tris ethoxy silane, vinyl tris (2-methoxy ethoxy) silane and vinyl trichlorosilane. Examples of vinyl silanes having different functional groups attached to the silicon atom are vinyl dimethoxy chlorosilane and vinyl ethoxy dichlorosilane.

Conversion of the trifunctional mono-vinyl silanes to siloxane polymer involves hydrolysis of the functional groups to hydroxyl groups, the resultant product being called a vinyl silanol.

This reaction is illustrated below:

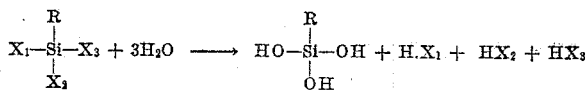

The vinyl silanol formed in the hydrolysis reaction is highly reactive, the hydroxyl groups of one silanol molecule readily condensing with the hydroxyl groups of other vinyl silanol molecules to form siloxane bonds as illustrated below for the formation of a disiloxane.

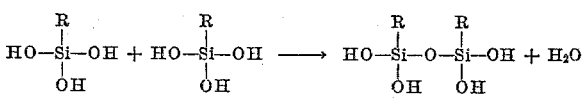

As is evident, the disiloxanes contain reactive OH groups. When these are condensed, polysiloxanes are formed and upon substantially complete condensation of such polysiloxanes, a highly complex cross-linked polymer results. However, by discontinuing the condensation reaction while there are still present some unreacted hydroxyl groups, the resultant gummy to solid polysiloxane polymer is sufficiently soluble in volatile organic solvents such as toluene and methyl alcohol to form solutions useful for coating abrasive grains. The coated abrasive grains are then moderately heated, e. g. 80° C. to 150° C. to remove the solvent, and finally at 200° C. to 400° C. to complete the condensation of polysiloxane and thus form a substantially infusible coating of vinyl polysiloxane on the abrasive grain surfaces.

For a more detailed discussion of the reactions of vinyl silanes, vinyl silanols and vinyl polysiloxanes, attention is directed to the article, "Reactions of Vinyltrichlorosilane and Vinyltriethoxysilane," by Wagner et al., "Industrial and Engineering Chemistry," vol. 45, pages 367–374, February 1953.

To coat the abrasive grain we thoroughly mix it with either a water hydrolyzable vinyl silane or a vinyl polysiloxane. That is the grain may be mixed with a monomeric vinyl polysiloxane in situ on the grain or the monomeric vinyl silane may be hydrolyzed and polymerized in solution by any of the conventional methods and the solution of the polysiloxane then applied to the grain.

When the water hydrolyzable vinyl silane is used, it may be used as such, but preferably it is used in solution in a suitable solvent such as toluene, ethyl alcohol or water. The solution may contain a suitable condensation catalyst such as an alkali or amine or an acid.

When the vinyl polysiloxane is used, it is preferably employed in solution in toluene and normally no catalyst is required.

The abrasive grains can be either fused aluminum oxide grain, silicon carbide, corundum, diamond, boron carbide and the like. The size of the grain will normally be from 8–180 mesh.

After the grain is coated with the silane or the polysiloxane, it is air dried for approximately an hour, then given a pre-bake at about 125° C. for another hour and preferably finally baked at temperatures of from 225° C.– 400° C. for an additional hour.

To fabricate the vinyl polysiloxane coated abrasive grain into an abrasive wheel, it is mixed with a wetting agent such as furfural or with a liquid heat-hardenable phenol-aldehyde resin. After thorough mixing, the furfural or resin wetted grains are mixed with a powdered potentially heat-reactive phenol-aldehyde resin. The mixture can then be cold molded under a pressure of 1000– 10,000 p. s. i. and the cold pressed article then baked according to the following representative schedule:

| Temperature | Time cycle | |
|---|---|---|
| 37° C. to 79° C. | minutes | 20 |
| 79° C. to 90° C. | hours | 2 |
| At 90° C. | do | 12 |
| 90° C. to 102° C. | do | 2 |
| At 102° C. | do | 3 |
| 102° C.–118° C. | do | 3 |
| At 118° C. | do | 3 |
| 118° C.–140° C. | do | 4 |
| At 140° C. | do | 2 |
| 140° C.–185° C. | do | 8 |
| At 185° C. | do | 9 |

Satisfactory wheels can also be prepared using the "hot press" method in which the abrasive mixture is pressed hot, i. e. at temperatures of about 300° F.

A typical liquid heat-hardenable, phenol-aldehyde resin used as wetting agent is one prepared from equal molar quantities of phenol and paraform and reacted with an alkaline catalyst to a viscosity of approximately 350– 400 cps.

A typical potentially heat reactive phenol-aldehyde resin is one prepared from approximately 1.1 mole phenol to one mole formaldehyde in the form of a 37.5% aqueous solution using an acid catalyst. The brittle fusible resin obtained by this reaction is ground with the required amount of hardening agent such as hexamethylenetetramine to convert it when heated to the infusible insoluble state. It is usually ground to 98% through 200 mesh.

To test the strength characteristics of various abrasive mixes, duplicate test bars were prepared.

For Tables II, III, IV and V, the test bars were prepared to represent abrasive wheels having an open medium grain type structure, i. e. a wheel in which the grain is of medium size (about 54 mesh) and spaced somewhat widely apart. The pressed density of these bars was 43⅓ grams/inch³.

For Table VI the test bars were prepared to represent abrasive wheels having an open coarse grain structure, i. e. a wheel in which the grain is coarse (about 12–16 mesh) and spaced somewhat widely apart. The pressed density of these bars was 42 grams/inch³.

For Table VII the test bars were prepared to represent abrasive wheels having a dense, coarse grain structure, i. e. a wheel in which the grain is coarse (about 12–16 mesh) and closely spaced. The pressed density of these bars was 47½ grams/inch³.

The abrasive grain for the test bars shown in the tables was fused aluminum oxide which was given coatings of polysiloxane by the procedures described in the following examples.

Example 1

(a) Two thousand five hundred grams #54 size abrasive grain were mixed with a solution of 0.84 gram tris-2-methoxy ethoxy vinyl silane and 0.017 gram sodium hydroxide in 83.2 grams distilled water. The grain was uniformly coated by tumbling and stirring and then spread out on a shallow pan and allowed to air dry for three hours. During the drying the grain was frequently stirred. It was then baked at 125° C. for one hour and then another hour at 275° C. The cured vinyl polysiloxane coating constituted 0.01% by weight of the abrasive grain equivalent to a calculated coating thickness of about 7 molecules.

(b) For an 0.0056% by weight coating (about 4 molecules thick) 2500 grams #54 grain mixed with a solution 0.48 gram tris-2-methoxy ethoxy vinyl silane and 0.01 gram sodium hydroxide in 48 cc. distilled water and a similar drying and baking schedule followed.

(c) For an 0.0014% by weight coating of vinyl polysiloxane (about one molecule thick) 2500 grams #54 grain were mixed with 0.120 gram tris-2-methoxy ethoxy vinyl silane and 0.010 gram sodium hydroxide in 48 cc. distilled water and a similar drying and baking schedule followed.

Example 2

(a) For an 0.135% by weight coating of vinyl polysiloxane on #54 grain (about 100 molecules thick) 2500 grams of grain were mixed with 50 cc. of a toluene solution containing 3.38 grams of a solvent soluble partially condensed vinyl polysiloxane having an average molecular weight between 3000 and 5000, and an OH contact between 1% and 9%. The grain was uniformly coated by tumbling and stirring and spread out in a shallow pan. The mix was air dried for 30 minutes and then dried for one hour at 125° C. and then baked for 1¼ hours at 275° C.

(b) For an 0.01% by weight coating of vinyl polysiloxane on #54 grain (about 7 molecules thick) 2500 grams grain were mixed with 50 cc. of a toluene solution containing 0.25 gram of partially condensed vinyl polysiloxane.

(c) For an 0.0056% by weight coating of vinyl polysiloxane (about 4 molecules thick) 2500 grams of #54 grain were mixed with 50 cc. toluene solution containing 0.13 gram of partially condensed vinyl polysiloxane.

(d) For an 0.0014% by weight coating of vinyl polysiloxane (about one molecule thick) 2500 grams of #54 grain were mixed with 50 cc. toluene solution containing 0.034 gram of partially condensed vinyl polysiloxane.

Example 3

A vinyl polysiloxane coating was applied to abrasive grains as described in Example 2(b), but the grain was then air dried for 30 minutes, then dried for one hour at 125° C. and then baked for 15 minutes to one hour at 400° C.

The partially condensed vinyl polysiloxane used in toluene solution in Examples 2 and 3 had a softening point of 87° C.; 9.5% OH content; and an average molecular weight of about 3800–4000 as determined from cryoscopic values obtained in benzene, corresponding to the formula $(CH_2=CHSiO_{1.27}(OH)_{0.46})_{46}$.

Example 4

Tris-2-methoxy ethoxy vinyl silane was applied to the grain as described in Example 1, but the grain was then air dried for three hours and then baked for twenty minutes at 125° C.

The abrasive grain coated by the procedures described in Examples 1 to 4 were then mixed with heat-hardenable phenol-aldehyde resin using the following proportions for preparing test bars representative of an abrasive wheel having an open medium grain type structure.

One thousand, two hundred and twenty-five grams of polyvinylsiloxane coated #54 grain were mixed with 28 grams of a liquid phenol-formaldehyde resin having a viscosity of about 375 cps. After thorough mixing 147 grams of a powdered heat-hardenable phenol-formaldehyde resin were used to coat the wetted grains. One hundred thirty grams of this abrasive mixture were placed in a flexural bar test mold and cold molded into a bar 6″ x 1″ x ½″ under a pressure of 3–4 tons. Ten bars were pressed of each set having grain coated with a different thickness of vinyl polysiloxane. The pressed density of the bars was 43⅓ grams/cubic inch. The bars were baked according to the previously given baking schedule.

Three bars from each set were used for measuring the flexural strength at 25° C. and 200° C. respectively and three bars were immersed in water for 21 days at room temperature and then tested wet at 25° C. The results are shown in Tables II, III, IV and V.

To prepare test bars representative of an abrasive wheel having an open coarse grain structure, the folowing proportions were used.

Nine hundred grams vinyl polysiloxane coated #12 grain, 450 grams vinyl polysiloxane coated #14 grain, and 450 grams vinyl polysiloxane coated #16 grain were mixed with 50 grams of a liquid heat-hardenable phenol-formaldehyde resin. After thorough mixing 150 grams of powdered potentially heat-reactive phenol-formaldehyde resin were used to coat the wetted grains. One hundred twenty-six grams of this abrasive mixture were placed in a flexural bar test mold and cold molded into a bar 6″ x 1″ x ½″ under a pressure of 3–4 tons. Fifteen bars were pressed of each set having grain coated with a different thickness of polysiloxane. The pressed density was 42 grams/inch³. The bars were baked according to the previously given baking schedule.

Five bars from each set were used for measuring the flexural strength at 25° C. and 200° C., respectively, and five bars were immersed in water for 21 days at room temperature and then tested at 25° C. The results are shown in Table VI.

To prepare test bars representative of an abrasive wheel having a dense coarse grain structure, the following proportions were used.

Two hundred seventy-seven grams vinyl polysiloxane coated #12 grain, 276 grams vinyl polysiloxane coated #14 grain, and 277 grams vinyl polysiloxane coated #16 grain were mixed with 30 grams of a liquid heat-hardenable phenol-formaldehyde resin. After thorough mixing a mixture of 60 grams cryolite and 80 grams powdered potentially heat reactive phenol-formaldehyde resin were used to coat the resin wetted grains. 142.5 grams of this abrasive mixture were placed in a flexural bar test mold and cold molded into a bar 6″ x 1″ x ½″ under a pressure of 3–4 tons. Six test bars were pressed of each set having grain coated with a different thickness of polysiloxane. The pressed density was 47½ grams/inch³. The bars were baked according to the previously given baking schedule.

Three bars from each set were used for measuring the flexural strength at 25° C. and 200° C., respectively. Since the strengths of abrasive wheels having a dense coarse grain structure are not normally materially affected under wet grinding conditions, bars were not tested after being immersed in water. The results are shown in Table VII.

TABLE II

| Weight Percent Vinyl polysiloxane Coating on Grain | 0.01 | 0.0056 | 0.0014 | 0.01 | 0.0056 | 0.0014 | None |
|---|---|---|---|---|---|---|---|
| Calculated Molecular Thickness of Vinyl Polysiloxane Coating | 7 | 4 | 1 | 7 | 4 | 1 | -------- |
| Coating Procedure, Example | 1 | 1 | 1 | 2 | 2 | 2 | -------- |
| Flexural Strength, p. s. i. | | | | | | | |
| 25° C. Dry | 7,760 | 7,110 | 6,610 | 6,070 | 6,490 | 6,470 | 5,600 |
| 200° C. Dry | 6,840 | 6,600 | 6,240 | 5,810 | 6,300 | 6,210 | 5,170 |
| 25° C. Wet | 6,670 | 6,640 | 4,870 | 5,450 | 6,020 | 4,940 | 3,580 |
| Percent Retention of Strength | 86 | 93 | 74 | 90 | 93 | 76 | 64 |

TABLE III

| Weight Percent Vinyl polysiloxane Coating on Grain | 0.135 | 0.01 | 0.0014 | None |
|---|---|---|---|---|
| Calculated Molecular Thickness of Vinyl polysiloxane Coating | 100 | 7 | 1 | -------- |
| Coating Procedure, Example | 2 | 2 | 2 | -------- |
| Curing Time of Vinyl polysiloxane Coating at 275° C., minutes | 75 | 75 | 45 | -------- |
| Flexural Strength, p. s. i. | | | | |
| 25° C. Dry | 6,560 | 6,140 | 6,540 | 5,670 |
| 200° C. Dry | 6,230 | 5,340 | 5,800 | 5,400 |
| 25° C. Wet | 5,680 | 5,790 | 5,800 | 4,220 |
| Percent Retention of Strength | 86 | 94 | 89 | 74 |

TABLE IV

| Weight Percent Vinyl polysiloxane Coating on Grain | 0.135 | 0.01 | 0.0014 | 0.01 | None |
|---|---|---|---|---|---|
| Calculated Molecular Thickness of Vinyl polysiloxane Coating | 100 | 7 | 1 | 7 | -------- |
| Coating Procedure, Example | 3 | 3 | 3 | 2 | -------- |
| Curing Time of Vinyl polysiloxane coating at 400° C., minutes | 15 | 30 | 30 | -------- | -------- |
| Curing Time of Vinyl polysiloxane coating at 275° C., minutes | -------- | -------- | -------- | 75 | -------- |
| Flexural Strength, p. s. i. | | | | | |
| 25° C. Dry | 5,840 | 6,160 | 6,220 | 5,690 | 5,220 |
| 200° C. Dry | 5,930 | 6,170 | 5,820 | 5,960 | 4,720 |
| 25° C. Wet | 5,510 | 5,200 | 4,575 | 4,875 | 3,340 |
| Percent Retention of Strength | 94 | 84 | 73 | 86 | 64 |

TABLE V

| Weight Percent Vinyl polysiloxane Coating on Grain | 0.01 | 0.0056 | 0.0014 | None |
|---|---|---|---|---|
| Calculated Molecular Thickness of Vinyl polysiloxane coating | 7 | 4 | 1 | -------- |
| Coating Procedure, Example | 4 | 4 | 4 | -------- |
| Flexural Strength, p. s. i. | | | | |
| 25° C. Dry | 5,180 | 5,450 | 5,660 | 5,600 |
| 200° C. Dry | 5,080 | 5,280 | 5,330 | 5,170 |
| 25° C. Wet | 4,120 | 4,180 | 3,900 | 3,580 |
| Percent Retention of Strength | 79 | 77 | 69 | 64 |

TABLE VI

| Weight Percent Vinyl polysiloxane Coating on Grain | 0.028 | 0.0019 | 0.00028 | None |
|---|---|---|---|---|
| Calculated Molecular Thickness of Vinyl polysiloxane Coating | 100 | 7 | 1 | -------- |
| Coating Procedure, Example | 2 | 2 | 2 | -------- |
| Flexural Strength, p. s. i. | | | | |
| 25° C. Dry | 2,750 | 2,700 | 2,560 | 2,640 |
| 200° C. Dry | 3,110 | 3,060 | 2,800 | 2,540 |
| 25° C. Wet | 2,820 | 2,980 | 2,470 | 2,280 |
| Percent Retention of Strength | 102 | 110 | 96 | 86 |

TABLE VII

| Weight Percent Vinyl polysiloxane Coating on Grain | 0.029 | 0.002 | 0.00029 | None |
|---|---|---|---|---|
| Calculated Molecular Thickness of Vinyl polysiloxane Coating | 100 | 7 | 1 | -------- |
| Coating Procedure, Example | 2 | 2 | 2 | -------- |
| Flexural Strength, p. s. i. | | | | |
| 25° C. Dry | 5,050 | 4,270 | 3,440 | 2,900 |
| 200° C. Dry | 4,050 | 3,880 | 2,860 | 2,360 |

In the above tables by percent retention of strength is meant the ratio of wet strength to dry strength at 25° C.

It is quite evident from the tables that not only is the dry strength of the wheels increased at both room and elevated temperatures, but that a high percentage of this strength is retained under wet conditions. This is particularly true for coatings having a molecular thickness of about 4 to 100 and a baking time at 200° C. to 400° C.

While the invention has been described more particularly directed towards the use of these polysiloxane coated grains in the fabrication of abrasive wheels, these coated grains have also proven useful in the preparation of durable abrasive papers.

Typically, an abrasive paper can be made according to the following procedure.

A suitable paper, cloth or other flexible fabric backing material was given a coating of resin about 0.008″–0.015″ film thickness. A suitable resin for this purpose is one prepared by reacting one mole of phenol with two moles aqueous formaldehyde in the presence of alkaline catalyst. Sufficient water is then distilled off to yield a liquid resin of about 70% solids content and a viscosity of about six thousand centipoises. Abrasive grain of about 54 mesh previously coated as described by any one of the procedures of Ex. 1 to 4, was applied to the paper by dropping it on the paper or projecting it up to the coated paper through an electrostatic field in order to orientate the grains on their longest axis. A second light coat of resin was then applied to anchor the grains to the first coat. The abrasive coated paper was cured at 80° C.–110° C. for about four hours. The resulting product was superior as to water resistance and abrasive retention under application as compared to a product prepared under similar conditions, but using uncoated abrasive.

What is claimed is:

1. Abrasive grains individually coated with between 0.0001% and 0.35% by weight of a heat-hardened vinyl polysiloxane, the coating thickness being insufficient to bond together individual abrasive particles.

2. Method of coating abrasive grains which comprises forming a vinyl polysiloxane coating on the abrasive grains and in amount constituting between 0.0001% and 0.35% by weight of the abrasive grains, said amount providing a coating thickness insufficient to effect bonding together of individual abrasive grains and then curing the coating by baking it at temperatures between 200° C. and 600° C.

3. Method of treating abrasive grains which comprises wetting the grains with a trifunctional mono-vinyl silane having the structure

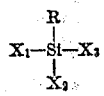

where R is —CH:CH$_2$, and X$_1$, X$_2$, and X$_3$ are each a monofunctional group selected from the class consisting of halogen and alkoxy, hydrolyzing the silane in situ on the abrasive grains to form a vinyl polysiloxane coating of insufficient thickness to cause bonding together of individual abrasive particles and then curing the coating by baking the vinyl polysiloxane coating at a temperature of at least about 200° C., said baked coating constituting between 0.0001% and 0.35% by weight of the abrasive grains.

4. Bonded abrasive structure comprising abrasive grains individually coated with a heat-hardened vinyl polysiloxane in an amount between 0.0001% and 0.35% by weight of the abrasive grains, said amount being insufficient to cause bonding together of individual abrasive grains, said coated grains being bonded together with a heat-hardened phenolaldehyde resin.

References Cited in the file of this patent

UNITED STATES PATENTS

| | | |
|---|---|---|
| 2,481,349 | Robb | Sept. 6, 1949 |
| 2,559,122 | Hessel et al. | July 3, 1951 |
| 2,559,664 | Ries et al. | July 10, 1951 |
| 2,645,628 | Hurd | July 14, 1953 |
| 2,688,007 | Steinman | Aug. 31, 1954 |